United States Patent
Kibe et al.

[11] Patent Number: 6,016,788
[45] Date of Patent: Jan. 25, 2000

[54] FUEL INJECTION CONTROL SYSTEM FOR A DIESEL ENGINE

[75] Inventors: Kazuya Kibe; Masato Gotoh, both of Susono; Tatsuji Mizuno, Yokohama, all of Japan

[73] Assignee: Toyota Jidosha Kabushiki Kaisha, Toyota, Japan

[21] Appl. No.: 09/109,417

[22] Filed: Jul. 2, 1998

[30] Foreign Application Priority Data

Jul. 18, 1997 [JP] Japan ................................ 9-194358

[51] Int. Cl.⁷ ............................ F02D 21/08; F02D 43/00; F02M 25/07
[52] U.S. Cl. ........................ 123/399; 123/357; 123/478; 123/568.21
[58] Field of Search .................... 123/357, 358, 123/361, 399, 478, 492, 493, 568.21

[56] References Cited

U.S. PATENT DOCUMENTS

| | | | |
|---|---|---|---|
| 4,223,654 | 9/1980 | Wessel et al. | 123/358 |
| 4,368,705 | 1/1983 | Stevenson et al. | 123/357 |
| 5,377,651 | 1/1995 | Sczomak et al. | 123/568.28 |
| 5,738,126 | 4/1998 | Fausten | 123/399 X |

FOREIGN PATENT DOCUMENTS 63-143343  6/1988  Japan.

*Primary Examiner*—Tony M. Argenbright
*Attorney, Agent, or Firm*—Oliff & Berridge, PLC

[57] ABSTRACT

In a fuel injection control system, a throttle valve is provided on the intake air passage of a diesel engine and an EGR control valve is provided for recycling a part of the engine exhaust gas to the intake air system of the engine. An engine control unit (ECU) controls the intake air amount of the engine to a value corresponding to the engine operating condition by adjusting the throttle valve and the EGR control valve. Further, the ECU detects the actual intake air amount by an airflow meter disposed at the inlet of the intake air passage and determines the maximum fuel injection amount based on the engine speed and the actual intake air amount. The maximum fuel injection amount is the maximum amount of the fuel which does not generate the exhaust smoke. By restricting the actual fuel injection amount so that the actual fuel injection amount does not exceed the maximum fuel injection amount, the generation of the exhaust smoke is prevented in transient operating conditions of the engine regardless of a delay in the response of the EGR control valve.

2 Claims, 4 Drawing Sheets

FUEL INJECTION CONTROL SYSTEM FOR A DIESEL ENGINE

BACKGROUND OF THE INVENTION

1. Field of the Invention

The present invention relates to a fuel injection control system for a diesel engine. More specifically, the present invention relates to a fuel injection control system used for a diesel engine having an EGR device.

2. Description of the Related Art

An EGR (Exhaust Gas Recirculation) device which recycles a part of exhaust gas of an internal combustion engine to an intake air system is widely known in the art. When EGR is applied to an engine, since a mixture of exhaust gas and air is fed to the engine, the amount of fresh air fed to the engine decreases even if the total volume of the mixture of the gases fed to the engine is the same. This causes the combustion temperature of the engine to become lower and, thereby, the amount of $NO_x$ produced by the combustion to decrease.

When EGR is applied to a diesel engine, it is required to recycle a larger amount of exhaust gas to the intake air system compared to the gasoline engine in order to obtain the above-noted EGR effect, since combustion in a diesel engine is performed at a very high excess air ratio (for example, $\lambda \approx 30$).

Therefore, in some cases, a throttle valve disposed on the intake air passage of the diesel engine is used in order to recycle a large amount of exhaust gas. By throttling the intake air passage by the throttle valve, the amount of intake air (fresh air) flowing into the intake air passage decreases and the pressure in the intake air passage downstream of the throttle valve becomes low. Therefore, in this case, the amount of exhaust gas fed to the intake air passage can be largely increased by feeding exhaust gas to the intake air passage downstream of the throttle valve.

An example of an EGR device utilizing a throttle valve is disclosed in Japanese Unexamined Patent Publication (Kokai) No. 63-143343. The throttle valve in the '343 publication is connected to an accelerator pedal of the diesel engine and the degree of opening thereof is adjusted in accordance with the accelerator stroke (i.e., the amount of depression of the accelerator pedal).

In the '343 publication, the target value of the fuel injection amount is set in accordance with the accelerator stroke and the engine speed. Further, the device in the '343 publication determines whether the engine is accelerating based on the amount of change in the accelerator stroke, and if the engine is accelerating, the device terminates EGR (i.e., the feed of the exhaust gas to the intake air passage) and restricts the fuel injection amount so that the fuel injection amount does not exceed a maximum fuel injection amount determined by the engine speed and the boost pressure of the engine. Namely, in the '343 publication, EGR is stopped and the actual fuel injection amount is restricted to a maximum fuel injection amount when the engine is accelerating. When the fuel injection amount is large compared to the amount of intake air fed to the engine, exhaust smoke is generated by the combustion in the engine. The '343 publication intends to suppress the generation of this exhaust smoke by terminating EGR and limiting the fuel injection amount to the maximum fuel injection amount during acceleration.

However, it is found that, in some cases, the exhaust smoke is still generated during acceleration if the maximum fuel injection amount is determined only based on the engine speed and the engine boost pressure as in the device of the '343 publication. Though the device in the '343 publication stops EGR when acceleration is detected, the feed of the exhaust gas to the engine does not stop immediately due to a delay in the response of the EGR device and the exhaust gas already fed to the intake air passage. Therefore, exhaust gas is continuously fed to the engine even after EGR is stopped until the EGR device responds to the stop signal and all the exhaust gas remaining in the intake air passage is drawn into the engine. Thus, in the '343 publication, the amount of intake air actually fed to the engine immediately after EGR is stopped is smaller than the amount of intake air where no exhaust gas is drawn into the engine even if the engine speed and the boost pressure are the same. As explained before, the limit value of the fuel injection amount (the maximum fuel injection amount) in the '343 publication is determined from the engine speed and the boost pressure. Therefore, the limit value is set at a value excessively large compared to the actual amount of intake air immediately after EGR is stopped during acceleration. Thus, in the '343 publication, the exhaust smoke is generated during acceleration.

SUMMARY OF THE INVENTION

In view of the problem in the related art as set forth above, the object of the present invention is to provide a fuel injection control system capable of effectively preventing the generation of the exhaust smoke during acceleration of an diesel engine.

The object as set forth above is achieved by a fuel injection control system for a diesel engine, according to the present invention, comprising an EGR device for recycling a portion of the exhaust gas of a diesel engine into an intake air passage of the engine, target fuel injection amount setting means for setting a target value of a fuel injection amount of the engine in accordance with operating conditions of the engine, intake air flow detecting means for detecting an actual intake air amount of the engine, target intake air amount setting means for setting a target intake air amount in accordance with operating conditions of the engine, intake air control means for adjusting the amount of the exhaust gas recycled into the intake air passage by controlling the EGR device in such a manner that the difference between the actual intake air amount and the target intake air amount decreases, limit value setting means for setting a maximum value of the fuel injection amount in accordance with the speed of the engine and the actual intake air amount of the engine and restriction means for restricting an actual fuel injection amount of the engine so that the actual fuel injection amount does not exceed the maximum value set by the limit value setting means.

According to the present invention, the intake air control means controls the amount of the exhaust gas fed to the intake air passage in such a manner that the actual intake air amount approaches the target intake air amount determined by the engine operating conditions. Further, the limit value setting means sets the maximum fuel injection amount in accordance with the actual intake air amount. Therefore, the actual fuel injection is always restricted to the maximum fuel injection amount which corresponds to the actual intake air amount. Consequently, the actual fuel injection amount does not become excessively large compared to the actual intake air amount even if the actual intake air amount deviates from the target intake air amount. Namely, according to the present invention, first, the intake air amount of the engine is adjusted, then the maximum fuel injection amount is set in accordance with the actual intake air amount.

Therefore, the maximum fuel injection amount is always set at a suitable value even if the delay in the response of the EGR device occurs or the exhaust gas exists in the intake air passage. Thus, the generation of the exhaust smoke during acceleration is effectively prevented.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, an embodiment of the fuel injection control system according to the present invention will be explained, in detail, with reference to the accompanying drawings.

Figure 1:
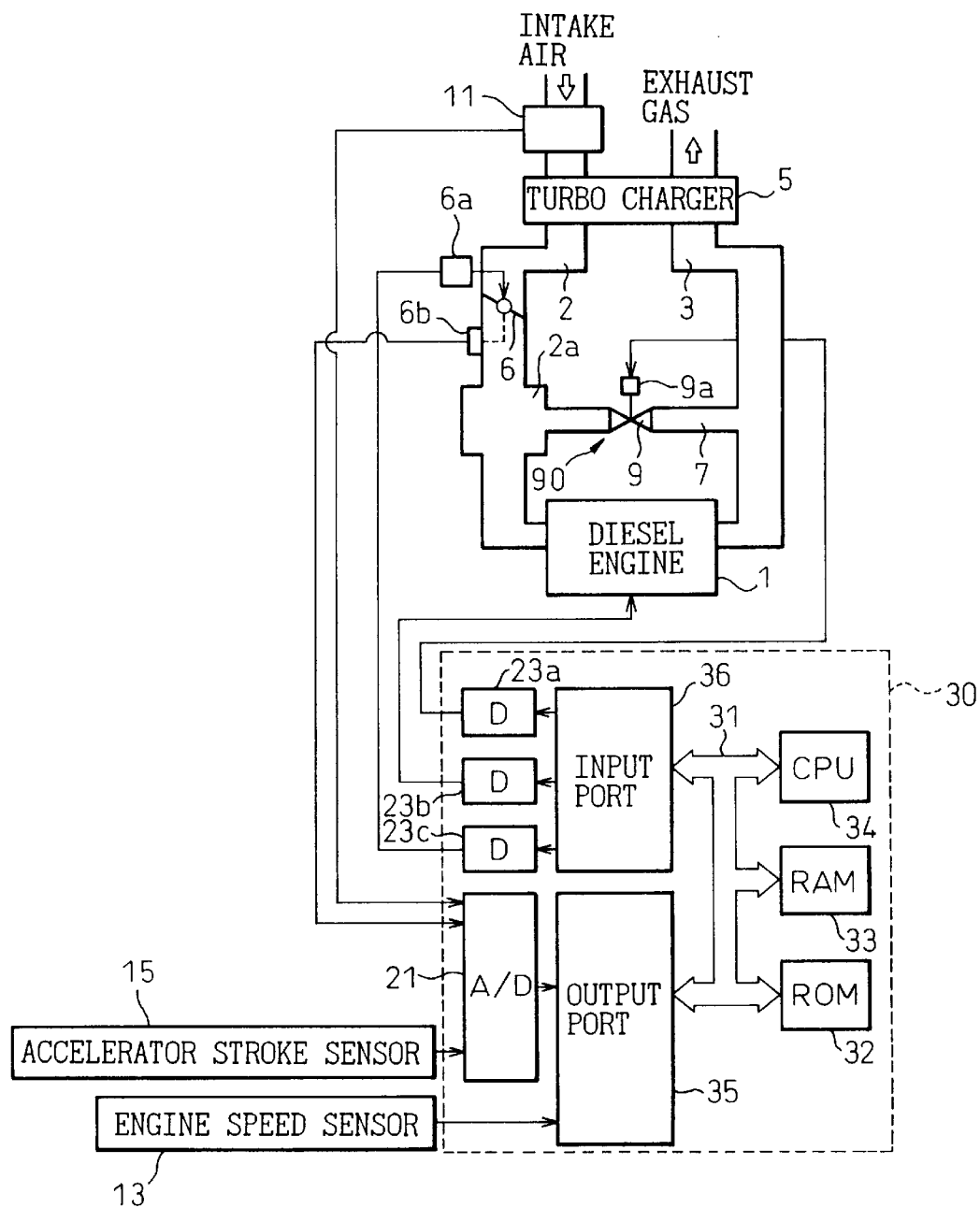
FIG. 1 schematically illustrates the general configuration of an embodiment of the present invention when it is applied to an automobile diesel engine.

FIG. 1 shows the general configuration of the fuel injection control system according to the present invention when it is applied to an automobile diesel engine having an EGR device.

In FIG. 1, reference numeral 1 designates a diesel engine and 2 and 3 designate an intake air passage and an exhaust passage of the engine 1, respectively. Numeral 5 is a turbocharger for boosting intake air pressure in the intake air passage 2. In this embodiment, an airflow meter 11 is disposed on the intake air passage 2. The airflow meter 11 in this embodiment is, for example, a hot-wire type flow meter which generates a signal corresponding to the flow rate of intake air flowing into the intake air passage 2. Further, in this embodiment, an EGR (Exhaust Gas Recirculation) device 90 which recycles some of the exhaust gas flowing through the exhaust gas passage 3 to a surge tank 2a of the intake air passage 2 is provided. The EGR device 90 includes an EGR passage 7 connecting the exhaust gas passage 3 to the surge tank 2a and an EGR control valve 9 disposed on the EGR passage 7. Numeral 9a in FIG. 1 shows an actuator of an appropriate type, such as a vacuum actuator or a stepper motor, which drives the EGR control valve 9 in response to a signal from an engine control unit (ECU) 30. As explained later, the ECU 30 adjusts the degree of opening of the EGR control valve 9 by actuating the actuator 9a in accordance with the difference between the actual intake air amount detected by the airflow meter 11 and a target intake air amount determined from the engine operating condition such as engine load and engine speed. By adjusting the degree of opening of the EGR control valve 9, the amount of the EGR gas (i.e., the exhaust gas recycling from the exhaust gas passage 3 to the surge tank 2a) is adjusted.

Further, in this embodiment, a throttle valve 6 is disposed on the intake air passage 2 at the portion between the turbocharger 5 and the surge tank 2a. The throttle valve 6 is a butterfly type valve having a plate type valve element driven by an actuator 6a of an appropriate type. The actuator 6a adjusts the degree of opening of the throttle valve 6 in response to a signal fed from the ECU 30. When the degree of opening of the throttle valve 6 is reduced, since the amount of intake air flowing into the intake air passage and the pressure in the surge tank 2a decrease, the amount of EGR gas recycled from the exhaust gas passage 3 to the surge tank 2a increases. In order to detect the degree of opening of the throttle valve 6, a throttle opening sensor 6a is disposed near the throttle valve 6.

The ECU 30, which may consist of a microcomputer, comprises a read-only-memory (ROM) 32, a random-access-memory (RAM) and a central processing unit (CPU) 34, an input port 35 and an output port 36, all connected to each other by a bi-directional bus 31. As explained later, the ECU 30 in this embodiment functions as the target intake air amount setting means which sets the target intake air amount in accordance with the operating condition of the engine, the intake air control means which adjusts the amount of the EGR gas in such a manner that the difference between the actual intake air amount and the target intake air amount decreases, the limit value setting means which sets the maximum fuel injection amount and the restriction means which restricts the actual fuel injection amount by the maximum fuel injection amount.

In order to perform these functions, a voltage signal which represents the accelerator stroke (i.e., the amount of depression of the accelerator pedal by the driver) ACCP is supplied to the input port 35 from an accelerator stroke sensor 15 disposed near the accelerator pedal (not shown). Further, a voltage signal from the airflow meter 11 which represents the flow rate Q of intake air and a voltage signal from the throttle opening sensor 6a which represents the degree of opening THO of the throttle valve 6 are supplied to the input port 35. These analogue voltage signals are supplied to the ECU 30 through a multiplexer-incorporating analogue-to-digital (A/D) converter 21 and converted to digital signals by an AD conversion routine performed by the ECU 30 at predetermined intervals. The converted values of Q, ACCP and THO are stored in the RAM 33 of the ECU 30. In addition to that, a pulse signal representing the engine revolution (engine speed) NE is supplied to the input port 35 of the ECU 30 from an engine speed sensor 13 disposed at the engine crankshaft (not shown). The ECU 30 calculates the engine speed NE from the frequency of the pulse signal at predetermined intervals and stores the calculated value of NE in the RAM 33. Further, the ECU 30 calculates the weight GN of intake air per one revolution of the engine based on the flow rate Q and the engine speed NE at predetermined intervals and stores the calculated value of GN in the RAM 33. Thus, the values of Q, GN, ACCP, NE and THO stored in the RAM 33 are updated at predetermined intervals.

The output port 36 of the ECU 30 is connected to fuel injection valves disposed on the respective cylinders of the engine 1 via a fuel injection circuit 23a in order to control the fuel injection amount of the engine. Further, the output port 36 is connected to the actuators 6a and 9a of the throttle valve 6 and the EGR control valve 9 via drive circuits 23b and 23c, respectively, in order to adjust the degree of opening of the throttle valve 6 and of the EGR control valve 9.

Next, the operation for setting the fuel injection amount QFINC in this embodiment will be explained.

In this embodiment, the ECU 30 determines a target value EACCP of the degree of opening THO of the throttle valve 6 based on the accelerator stroke ACCP and the engine speed NE. Then, after actuating the actuator 6b to adjust the degree of opening of the throttle valve 6 to the target value EACCP, the ECU 30 determines the target fuel injection amount QGOV based on the accelerator stroke ACCP and the engine speed NE.

Figure 2:
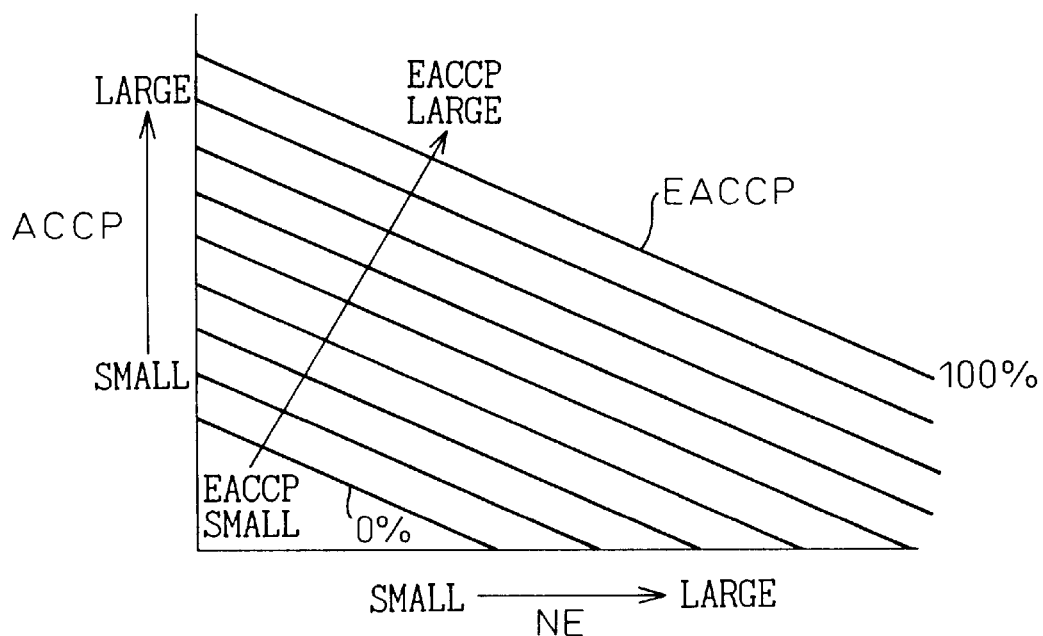
FIG. 2 is a graph illustrating the setting of the degree of opening of the throttle valve in the embodiment in FIG. 1.

FIG. 2 illustrates the relationship between the target value EACCP of the degree of opening of the throttle valve 6 and the accelerator stroke ACCP and the engine speed NE. As can be seen from FIG. 2, the target value EACCP is set at a larger value as the engine speed NE becomes higher when the accelerator stroke ACCP is the same, and as the accelerator stroke ACCP becomes larger when the engine speed NE is the same. Therefore, when the accelerator stroke (i.e., the amount of depression of the accelerator pedal) ACCP increases in a short time, such as during acceleration of the automobile, the degree of opening EACCP of the throttle valve 6 increases rapidly in order to allow the intake air amount of the engine to increase rapidly.

Figure 3:
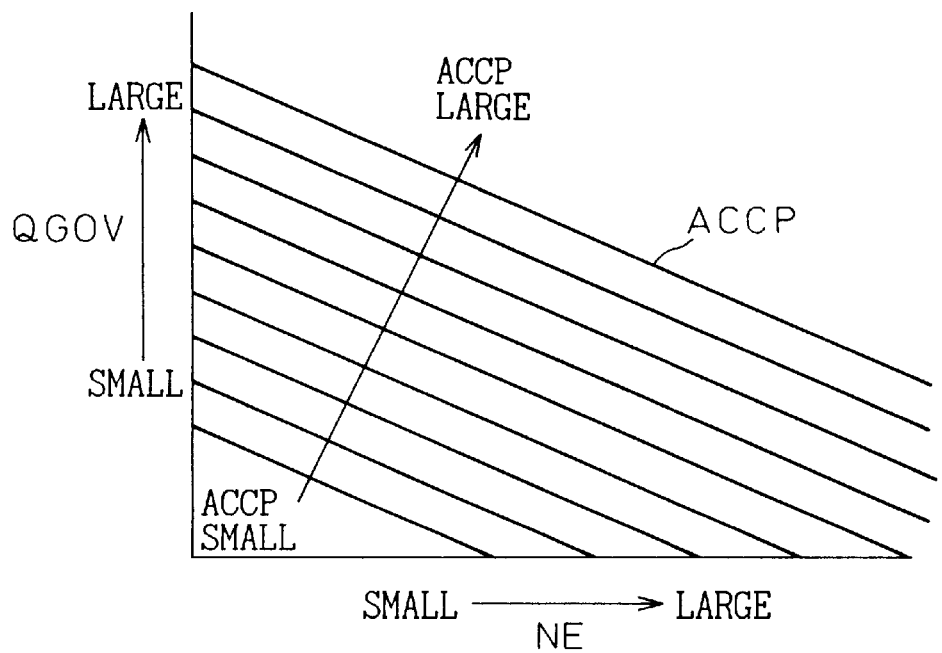
FIG. 3 is a graph illustrating the setting of the target fuel injection amount in the embodiment in FIG. 1.

On the other hand, FIG. 3 shows the relationship between the target fuel injection amount QGOV and the engine speed NE and the accelerator stroke ACCP. As can be seen from FIG. 3, the target fuel injection amount QGOV is set at a smaller value as the engine speed NE becomes higher when the accelerator stroke ACCP is the same, and set at a larger value as the accelerator stroke ACCP becomes larger when the engine speed NE is the same. The target fuel injection amount QGOV represents the engine output required by the driver of the automobile.

After determining the target fuel injection amount QGOV, the ECU 30 calculates a target value for intake air amount (a weight flow) GNTRG based on the target fuel injection amount QGOV and the present engine speed NE. The target intake air amount GNTRG is determined from a target air-fuel ratio $\lambda$TRG of the engine combustion. In this embodiment, the value of $\lambda$TRG is previously determined in accordance with the engine speed NE and the target fuel injection amount QGOV based on experiment using an actual engine, and the values of $\lambda$TRG is stored in the ROM 32 in the form of a numerical table using the values NE and QGOV as parameters. The target intake air amount GNTRG is obtained by multiplying $\lambda$TRG determined from the numerical table by the target fuel injection amount QGOV. Namely, the target intake air amount GNTRG represents the amount of intake air required for obtaining the target air-fuel ratio $\lambda$TRG when the fuel injection amount reaches the target fuel injection amount QGOV.

After calculating the target intake air amount GNTRG, the ECU 30 adjusts the amount of EGR gas flowing through the EGR control valve 9 so that the actual intake air amount (weight flow) GN approaches the target intake air amount GNTRG. Namely, the ECU 30 decreases the degree of opening DEFIN of the EGR control valve 9 by an amount corresponding to the difference (GNTRG−GN) when GNTRG is larger than GN. By doing so, since the amount of EGR gas decreases, the intake air amount GN increases and approaches to the target intake air amount GNTRG. Conversely, when GNTRG is smaller than GN, the ECU 30 increases DEFIN by an amount corresponding to the difference (GN−GNTRG) to decrease intake air amount GN. The amount of the change in the degree of opening DEFIN explained above is set at a larger value as the deviation between GNTRG and GN (|GNTRG−GN|) becomes larger and at a smaller value as the deviation becomes smaller. The relationship between the amount of change in the degree of opening DEFIN and the deviation |GNTRG−GN| is determined based on experiment using an actual engine.

After adjusting the amount of EGR gas in the manner explained above, the ECU 30 determines the maximum fuel injection amount (the limit value) QFULLE in accordance with the present intake air amount GN (i.e., the intake air amount after the degree of opening DEFIN of the EGR control valve 9 is adjusted) and the engine speed NE. QFULLE is the maximum limit of the fuel injection amount in order to maintain the air-fuel ratio in the cylinder of the engine within the range where no exhaust smoke is generated by the combustion at the present intake air amount GN. The lowest air-fuel ratio of the combustion which does not generate the exhaust smoke changes in accordance with the engine speed NE. For example, in a diesel engine, since the boost pressure and the temperature of the combustion chamber generally becomes higher as the engine speed increases, the state of combustion becomes better as the engine speed increases. Therefore, the lowest air-fuel ratio of the combustion which does not generate the exhaust smoke becomes lower (rich) as the engine speed increases.

Further, as explained before, during the transient operating condition of the engine such as acceleration of the automobile, the amount of intake air supplied to the engine does not become the target intake air amount GNTRG immediately due to the delay in the response of the EGR control valve 9 and the exhaust gas already fed to the surge tank 2a even if the degree of opening of the EGR control valve 9 is decreased. However, the intake air amount GN detected by the airflow meter 11 is always the same as the amount of air drawn into the engine. Therefore, by determining the maximum fuel injection amount QFULLE based on the actual intake air amount GN and the engine speed NE, the maximum fuel injection amount QFULLE is always set at a suitable value.

Figure 4:
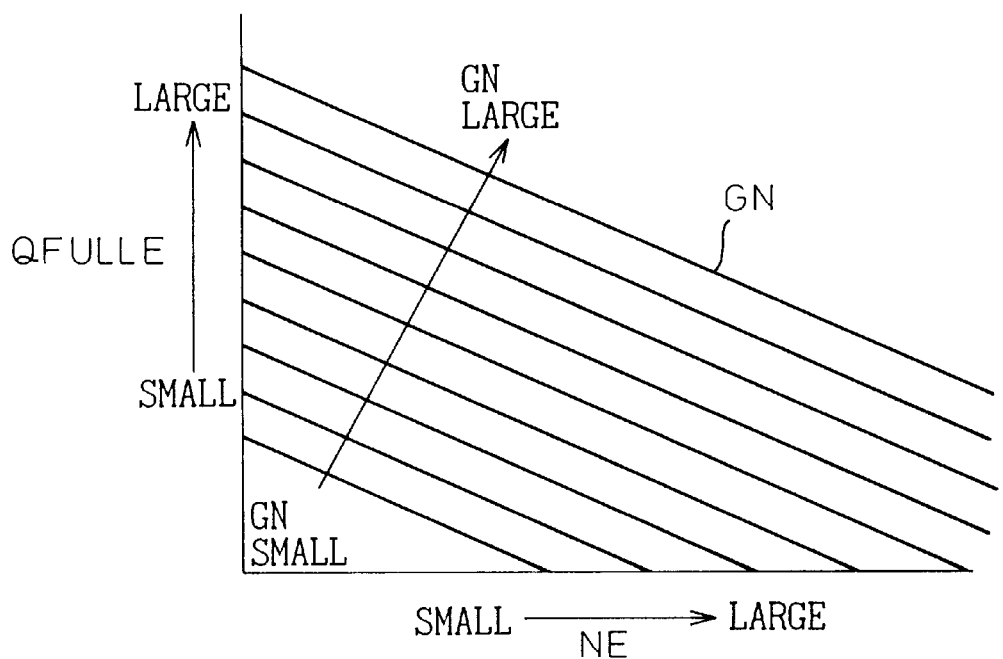
FIG. 4 is a graph illustrating the setting of the maximum fuel injection amount in the embodiment in FIG. 1.

FIG. 4 illustrates the relationship between the maximum fuel injection amount QFULLE and GN, NE. As can be seen from FIG. 4, QFULLE is set at a larger value as the intake air amount GN becomes larger when the engine speed NE is the same, and as the engine speed NE becomes smaller when the intake air amount GN is the same. The actual relationship between QFULLE and GN, NE is determined based on experiment using an actual engine.

The fuel injection amount QFINC is set at the target fuel injection amount QGOV or the maximum fuel injection amount QFULLE whichever is smaller. Namely, if the target fuel injection amount QGOV is smaller than the maximum fuel injection amount QFULLE, the actual fuel injection amount QFINC is set at the target fuel injection amount QGOV and the amount QGOV of fuel is fed to the engine per one revolution of the engine. On the other hand, if the target fuel injection amount QGOV is larger than the maximum fuel injection amount QFULLE, the actual fuel injection amount QFINC is set at the maximum fuel injection amount QFULLE, i.e., the actual fuel injection amount is restricted to the maximum value QFULLE which maintains the air-fuel ratio of the combustion within the range where no exhaust smoke is generated. Therefore, the generation of the exhaust gas smoke does not occur even if a delay in the response of the EGR device occurs and exhaust gas exists in the surge tank during transient operating conditions of the engine.

Figure 5:
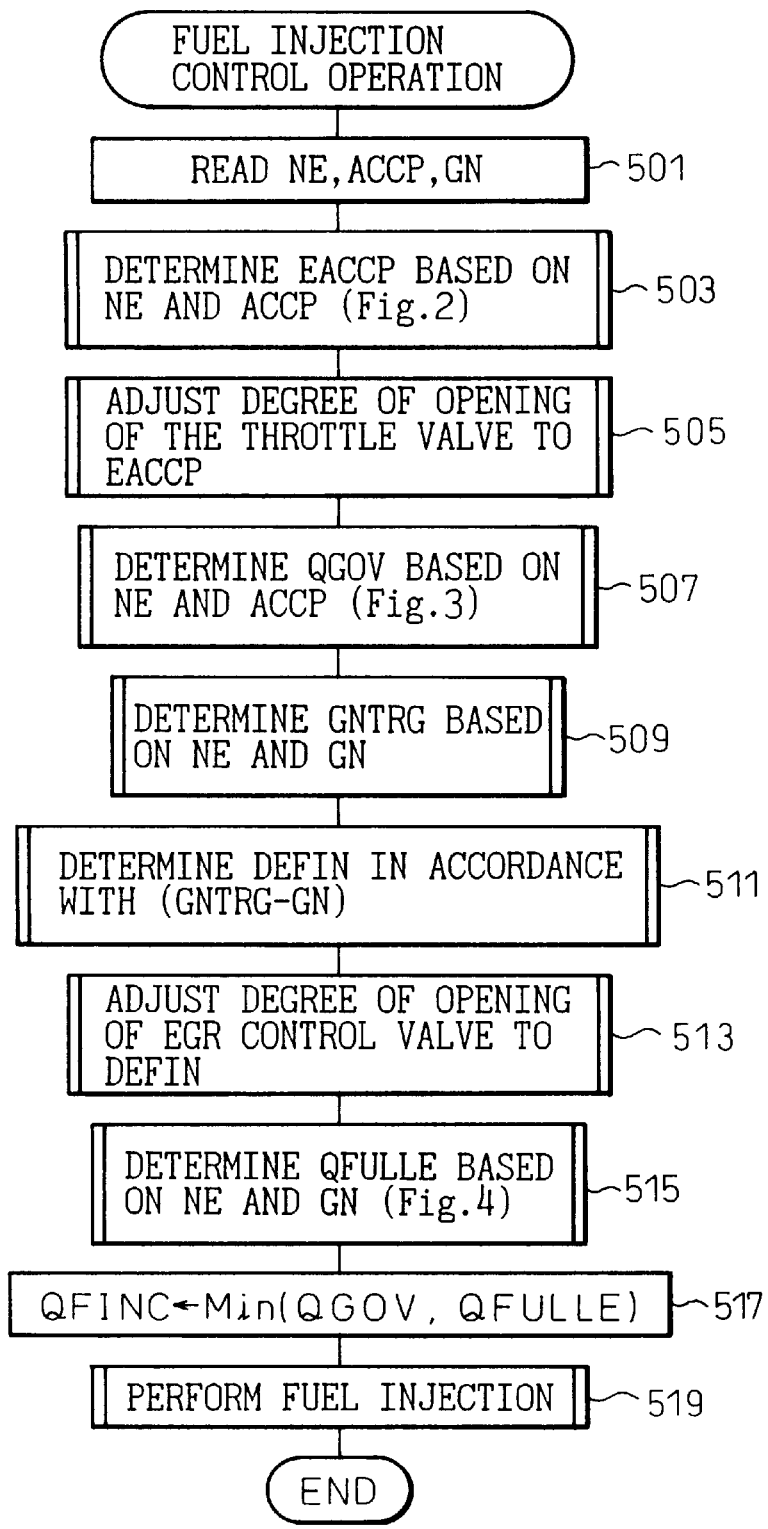
FIG. 5 is a flowchart explaining the fuel injection control operation in the embodiment in FIG. 1.

FIG. 5 is a flowchart illustrating the fuel injection control operation as explained above. This operation is performed by a routine executed by the ECU 30 at predetermined rotation angles of the engine crankshaft.

In FIG. 5, at step 501, the operation reads the engine speed NE, accelerator stroke ACCP and the intake air amount (weight flow) per one revolution of the engine GN. At step 503, the degree of opening EACCP of the throttle valve 6 is determined from NE and ACCP in accordance with the relationship in FIG. 2 and, at step 505, the actuator 6a is operated in order to adjust the degree of opening of the throttle valve to the value EACCP. Further, at step 507, the target fuel injection amount QGOV is determined from the engine speed NE and the accelerator stroke ACCP in accordance with the relationship in FIG. 3. Then, at step 509, the target air-fuel ratio λTRG is determined from the engine speed NE and the target fuel injection amount QGOV based on the numerical table stored in the ROM 32, and the target intake air amount GNTRG is calculated from λTRG and QGOV.

At step 511, the deviation of the target intake air amount GNTRG calculated at step 509 and the actual intake air amount GN (|GNTRG−GN|) is calculated, and the degree of opening DEFIN of the EGR control valve 9 is adjusted in accordance with the deviation |GNTRG−GN| at step 513.

Namely, in this embodiment, first, the degree of opening of the throttle valve 6 is adjusted in accordance with the engine operating condition at step 501, then, the amount of EGR gas is adjusted at step 513 in such a manner that the actual intake air amount GN approaches the target intake air amount GNTRG determined in accordance with the engine operating condition. Thus, the actual intake air amount GN approaches the target intake air amount GNTRG rapidly.

After adjusting the actual intake air amount GN by the steps explained above, the maximum fuel injection amount QFULLE is determined from the engine speed NE and the actual intake air amount GN in accordance with the relationship in FIG. 4. Then, at step 517, the actual fuel injection amount QFINC is set at the smaller of the target fuel injection amount QGOV and the maximum fuel injection amount QFULLE. When the actual fuel injection amount QFINC is determined, a signal corresponding to the amount QFINC is transmitted to the fuel injection circuit 23a and the amount QFINC of fuel is injected from the fuel injection valves.

As explained above, in the present embodiment, first, the actual intake air amount GN is adjusted so that the actual intake air amount approaches the target intake air amount GNTRG (steps 505 and 513 in FIG. 5), then, the maximum fuel injection amount QFULLE is set in accordance with the value of the actual intake air amount GN after GN is adjusted. Therefore, the maximum fuel injection amount QFULLE is set at a value corresponding to the actual amount of air fed to the engine and the generation of the exhaust smoke in a transient operating condition of the engine does not occur regardless of a delay in the response of the EGR device and the exhaust gas remaining in the intake air system.

We claim:

1. A fuel injection control system for a diesel engine comprising:

an EGR device for recycling a portion of the exhaust gas of a diesel engine into an intake air passage of the engine;

target fuel injection amount setting means for setting a target value of a fuel injection amount of the engine in accordance with operating conditions of the engine;

intake air flow detecting means for detecting an actual intake air amount of the engine;

target intake air amount setting means for setting a target intake air amount in accordance with operating conditions of the engine;

intake air control means for adjusting the amount of the exhaust gas recycled into the intake air passage by controlling the EGR device in such a manner that the difference between the actual intake air amount and the target intake air amount decreases;

limit value setting means for setting a maximum value of the fuel injection amount in accordance with the speed of the engine and the actual intake air amount of the engine; and restriction means for restricting an actual fuel injection amount of the engine so that the actual fuel-injection amount does not exceed the maximum value set by the limit value setting means.

2. A fuel injection control system as set forth in claim 1, wherein the intake air control means further comprises throttle control means for adjusting a degree of opening of a throttle valve disposed on the intake air passage in accordance with engine operating conditions and controls the EGR device in such a manner that the difference between the actual intake air amount after the degree of the opening of the throttle valve is adjusted and the target intake air amount decreases.

* * * * *